United States Patent [19]
Ueyoko

[11] Patent Number: 6,079,467
[45] Date of Patent: Jun. 27, 2000

[54] HEAVY DUTY RADIAL TIRE WITH SPECIFIED ARRANGEMENT OF CHAFER AND CARCASS TURNUP

[75] Inventor: Kiyoshi Ueyoko, Kobe, Japan

[73] Assignee: Sumitomo Rubber Industries, Ltd., Hyogo-ken, Japan

[21] Appl. No.: 09/224,051

[22] Filed: Dec. 31, 1998

[30] Foreign Application Priority Data

Jan. 7, 1998 [JP] Japan ................................. 10-001745

[51] Int. Cl.$^7$ ....................................................... B60C 5/16
[52] U.S. Cl. ..................... 152/543; 152/539; 152/546; 152/548; 152/552; 152/554
[58] Field of Search ................................. 152/552, 554, 152/543, 546, 539, 548

[56] References Cited

FOREIGN PATENT DOCUMENTS

| 0 554 108 A1 | 8/1993 | European Pat. Off. | ................ | 152/543 |
|---|---|---|---|---|
| 24 51 530 | 5/1976 | Germany | ................ | 152/554 |
| 2-124302 | 5/1990 | Japan | ................ | 152/539 |
| 3-204313 | 9/1991 | Japan | ................ | 152/552 |

Primary Examiner—Adrienne C. Johnstone
Attorney, Agent, or Firm—Birch, Stewart, Kolasch & Birch, LLP

[57] ABSTRACT

A heavy duty radial tire comprises a carcass ply being turned up around bead cores from the axially inside to the outside of the tire, a bead apex disposed between the carcass main portion and each turnup portion, the turnup portion extending radially outwardly beyond the radially outer end of the bead apex so that the turnup portion has a parallel part which is placed adjacent to and substantially in parallel with the main portion, and a chafer disposed in each bead portion and extending radially outwardly beyond the radially outer end of the bead apex along the axially outside of the turnup portion. The thickness T2 of the chafer is 0.3 to 1.0 times the total rubber thickness T1 between the tire outer surface and the carcass when measured along a straight line drawn at a right angle to the carcass main portion through the radially outer end of the bead apex. The length L of the parallel part is in the range of 0.5 to 5.0 times a section width CW of the bead core. In the parallel part, the rubber thickness N between the carcass cords of the turnup portion and those of the main portion is 0.15 to 4.5 times the maximum diameter K of the carcass cords.

7 Claims, 11 Drawing Sheets

COMPARATIVE ART (A) 50 kpa pressure (B) Standard pressure

HEAVY DUTY RADIAL TIRE WITH SPECIFIED ARRANGEMENT OF CHAFER AND CARCASS TURNUP

BACKGROUND OF THE INVENTION

The present invention relates to a pneumatic tire, more particularly to a heavy duty radial tire having an improved bead and lower sidewall structure capable of improving the bead durability.

FIELD OF THE INVENTION

In radial tires for heavy duty vehicles such as trucks and buses, the bead portion and sidewall lower portion of the tires are subjected to a large bending deformation, and accordingly, the outer surface thereof is liable to crack, which sometimes causes further damage such as the carcass ply becomes loose. Therefore, if the bead or sidewall surface is cracked, it is impossible to recycle such tires by retreading.

DESCRIPTION OF THE RELATED ART

In order to improve bead durability by increasing the rigidity of the bead portions, hitherto, as shown in FIG. 10(A), a bead apex rubber (b) which is inserted between the carcass main portion (a1) and the turnup portion (a2) is increased in the volume and height.

In such a conventional structure, however, under severe service conditions, the increased rubber volume increases heat generation. Further, when the sidewall portions are greatly bent axially and outwardly, the carcass ply turnup portion (a2) is subjected to a large compression strain, and this portion is liable to crease. Furthermore, as the radially outer end of the turnup portion approaches the tire outer surface, and as a relatively large stress concentrates on the end of the turnup portion, separation of the carcass ply edge, loose cord and cracks are liable to occur. Thus, bead durability is lost quickly.

SUMMARY OF THE INVENTION

It is therefore an object of the present invention to provide a heavy duty radial tire, in which internal temperature rise, creasing of the carcass turnup portion of the tire, separation of the ply edge, loose cord and sidewall cracks are effectively controlled to improve the bead durability of the tire.

Accordingly to one aspect of the present invention, a heavy duty radial tire comprises
 a tread portion,
 a pair of sidewall portions,
 a pair of bead portions with a bead core therein,
 a carcass comprising a ply of cords arranged radially at an angle of from 70 to 90 degrees with respect to the tire equator extending between the bead portions through the tread portion and sidewall portions and turned up around the bead cores from the axially inside to the outside of the tire to form a pair of turnup portions and a main portion therebetween,
 a bead apex disposed between the main portion and each turnup portion of the carcass ply and extending radially outwardly form the bead core, and
 a chafer disposed in each bead portion to define a rim contacting surface,
 each turnup portion extending radially outwardly beyond the radially outer end of the bead apex so that the turnup portion has a parallel part which is placed adjacent to and substantially in parallel with the main portion,
 the chafer extending radially outwardly along the axially outside of the turnup portion beyond the radially outer end of the bead apex.

Further, the bead apex height decreases and the rubber volume between the carcass turnup portion and main portion is decreased. Contrariwise, the rubber volume on the axially outside of the carcass turnup portion is increased by the chafer. Accordingly, the main heat source shifts from the bead apex to the chafer, and the generated heat easily radiates. Further, by the existence of the parallel part, the turnup portion is prevented from being subjected to compressive strain even if the tire is greatly deformed. Therefore, internal temperature rise, carcass turnup crease, carcass ply edge separation, loose cord and sidewall cracks can be prevented, and the bead durability is effectively improved. An embodiment of the present invention will now be described in detail in conjunction with the accompanying drawings.

DETAILED DESCRIPTION OF THE INVENTION

Figure 1:
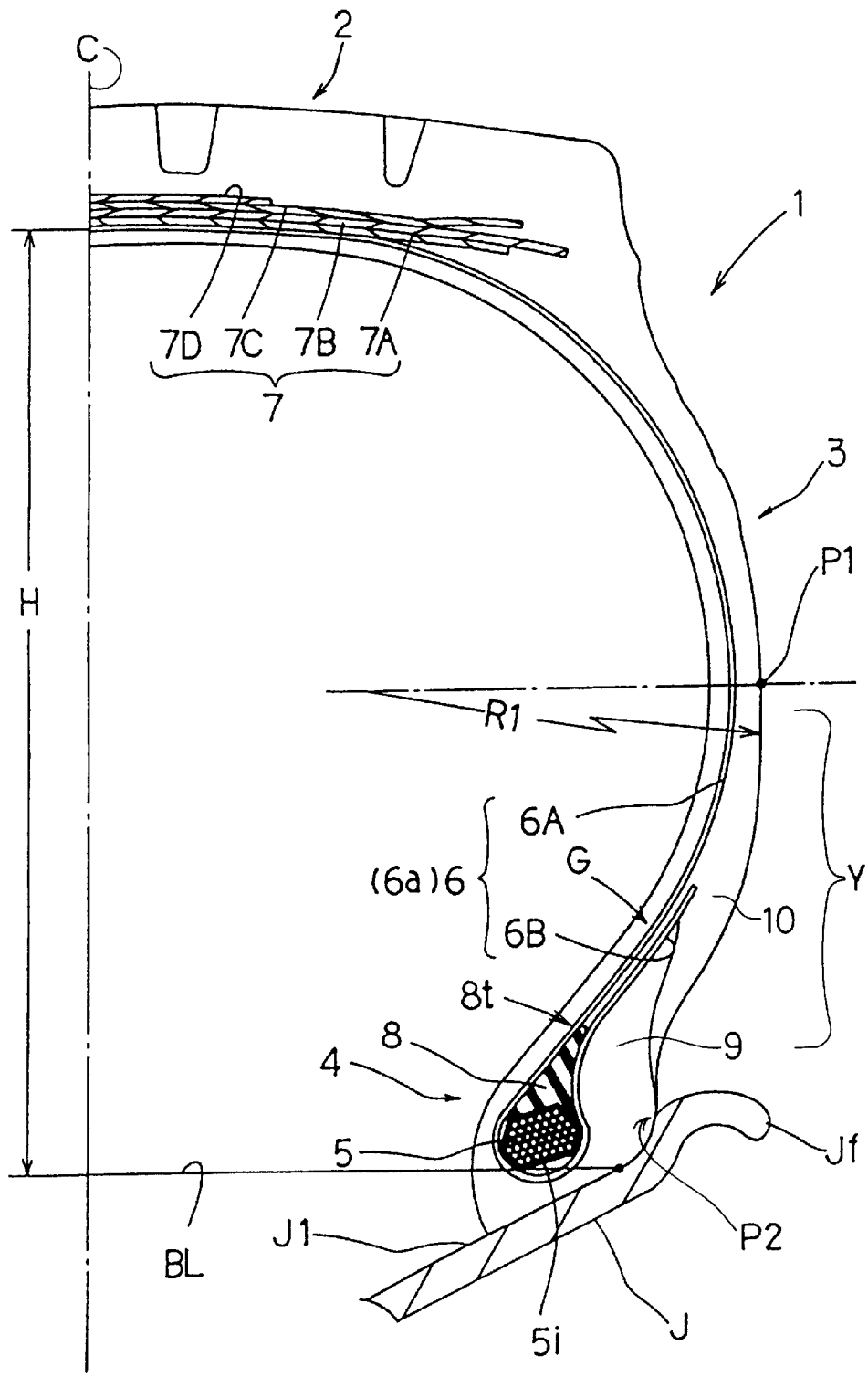
FIG. 1 is a cross sectional view of a heavy duty radial tire showing an embodiment of the present invention.

In the drawings, the tire 1 according to the present invention comprises a tread portion 2, a pair of axially spaced bead portions 4 with a bead core 5 therein, a pair of sidewall portions 3 extending between the tread edges and the bead portions, a carcass 6 extending between the bead portions 4, and a belt 7 disposed radially outside the carcass 6 in the tread portion 2.

FIG. 1 shows a meridian section of the tire under the standard condition in which the tire is mounted on a standard rim J and inflated to a standard pressure and loaded with no tire load. The standard rim is a rim specified as standard rim or measuring rim in the well known standards, such as JATMA (Japan and Asia), T&RA (North America), ETRO (Europe), STRO (Scandinavia) and the like, and the standard pressure is a maximum pressure specified in the standard.

In this embodiment, the tire 1 is a tube-less heavy-duty radial tire for trucks and buses, which is mounted on a 15 deg. tapered rim.

The above-mentioned carcass 6 comprises at least one ply 6a arranged radially at an angle of from 70 to 90 degrees with respect to the equator C, and extending between the bead portions 4 through the tread portion 2 and the sidewall portions 3, and turned up around the bead cores 5 from the axially inside to the outside of the tire, so as to form a pair of turnup portions 6B and a main portion 6A therebetween. For the carcass cords, preferably, steel cords are used, but organic fiber cords, e.g. polyester, rayon, nylon, aromatic polyamide and the like can be used. In this example, the carcass 6 is composed of a single ply 6a of steel cords arranged at substantially 90 degrees with respect to the tire equator C.

The belt 7 comprises at least two crossed plies. For the belt cords, steel cords, organic fiber cords, e.g. nylon, aromatic polyamides, rayon, nylon and the like can be used. In this example, the belt 7 is composed of four plies; a radially innermost ply 7A made of parallel steel cords laid at a predetermined angle of 50 to 70 degrees with respect to the tire equator C; and radially outer plies 7B, 7C and 7D made of parallel steel cords laid at angles of not more than 30 degrees with respect to the tire equator C.

The above-mentioned bead core 5 is formed by winding a steel wire predetermined times in a generally hexagonal cross sectional shape in this example and the outside thereof is coated with rubber. Aside from steel wire, high modulus organic cords, e.g. aromatic polyamide and the like may be used. A radially inner side 5i of the hexagon which is longest is inclined at 10 to 17 degrees, in this example almost 15 degrees with respect to the axial direction which corresponds to the inclination of the tapered bead seat J1 of the standard rim J.

The above-mentioned bead portions 4 are each provided with a bead apex 8 and a chafer 9.

The bead apex 8 is disposed between the carcass ply main portion 6A and turnup portion 6B. the bead apex 8 is made of rubber preferably having a JIS A hardness of 60 to 99 degrees, more preferably 70 to 95 degrees. The bead apex 8 extends radially outwardly from the bead core 5 and tapers radially outwardly. Under the above-mentioned standard condition, the bead apex height h1 is in the range of from 6 to 31%, preferably 8 to 28%, more preferably 8 to 25% of the carcass section height H (in FIG. 2 about 11%).

The bead apex height h1 is measured radially between the radially outer end 8t of the bead apex and the bead base line BL. The carcass height H is measured radially between the thickness center line of the carcass and the bead base line BL along the tire equator C. incidentally, the bead base line BL corresponds to the rim diameter of the standard rim.

The above-mentioned carcass turnup portion 6B first extends radially outwardly along the axially outer surface 8o of the bead apex 8 from the axially outer extreme end of the bead core 5 to the radially outer end of the bead apex 8. Then, on the radially outside of the bead apex 8, the turnup portion 6B extends substantially in parallel with the axially outermost carcass ply main portion 6A (hereinafter, parallel part G). The turnup portion 6B terminates at a position (height h2) which is radially outward of the outer end 8t of the bead apex 8 but radially inward of the maximum width point P1 of the tire. The height h2 measured from the bead base line BL is preferably in the range of from 15 to 50%, more preferably 20 to 40% of the carcass section height H, (in this example h2 is 29%).

The axially outer surface 8o of the bead apex 8 is defined by a concave line. Thus, the corresponding adjacent part of the carcass turnup portion 6B also has a similar concave profile. On the other hand, the axially inner surface 8i of the bead apex 8 is defined by a substantially straight line. Thus, the adjacent part of the carcass main portion 6A which is in contact therewith has a straight profile, whereby deformation of the bead portion due to tire inflation and application of tire load can be reduced.

Figure 4:
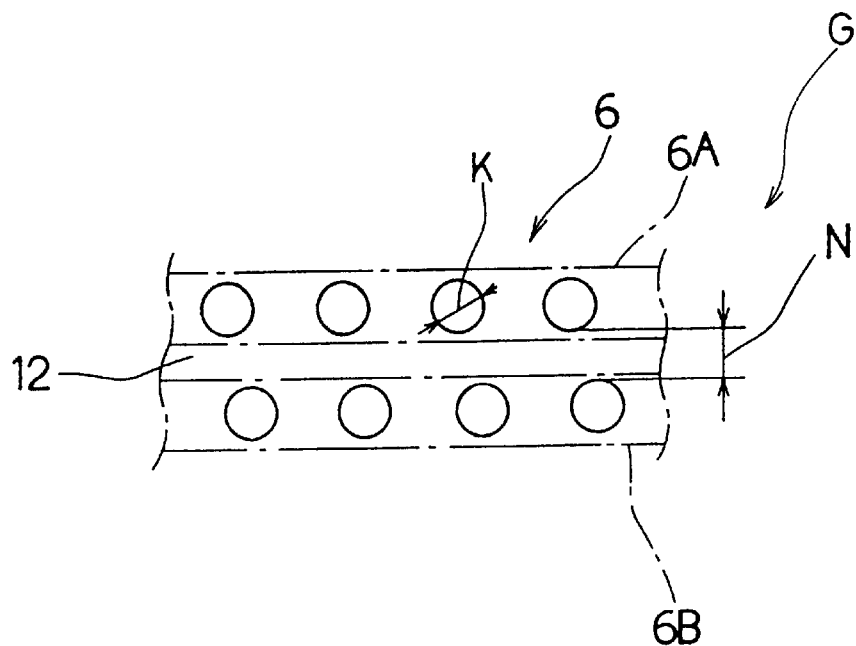
FIG. 4 is an enlarged cross sectional view for explaining the cord spacing in the parallel part.

In the parallel part G, as shown in FIG. 4, the cord spacing N between the axially adjacent carcass main portion and the turnup portion is set in the range of from 0.15 to 4.5 times, preferably 1.3 to 3.5 times the maximum diameter K of the carcass cords. That is, a rubber layer whose minimum thickness corresponds to the cord spacing N exists between the carcass main portion 6A and turnup portion 6B, whereby the share therebetween can be effectively mitigated. In this example, a separate rubber layer 12 called cushion rubber having elastic characteristics similar to the topping rubber for the carcass ply is disposed between the main portion 6A and turnup portion 6B. However, it is also possible to use the topping rubber itself as a substitute for the cushion rubber layer 12 if a required uniform thickness can be obtained. In case the carcass 6 is composed of two or more plies, it is necessary to have at least on 1 ply which has the above-explained parallel part G.

Figure 2:
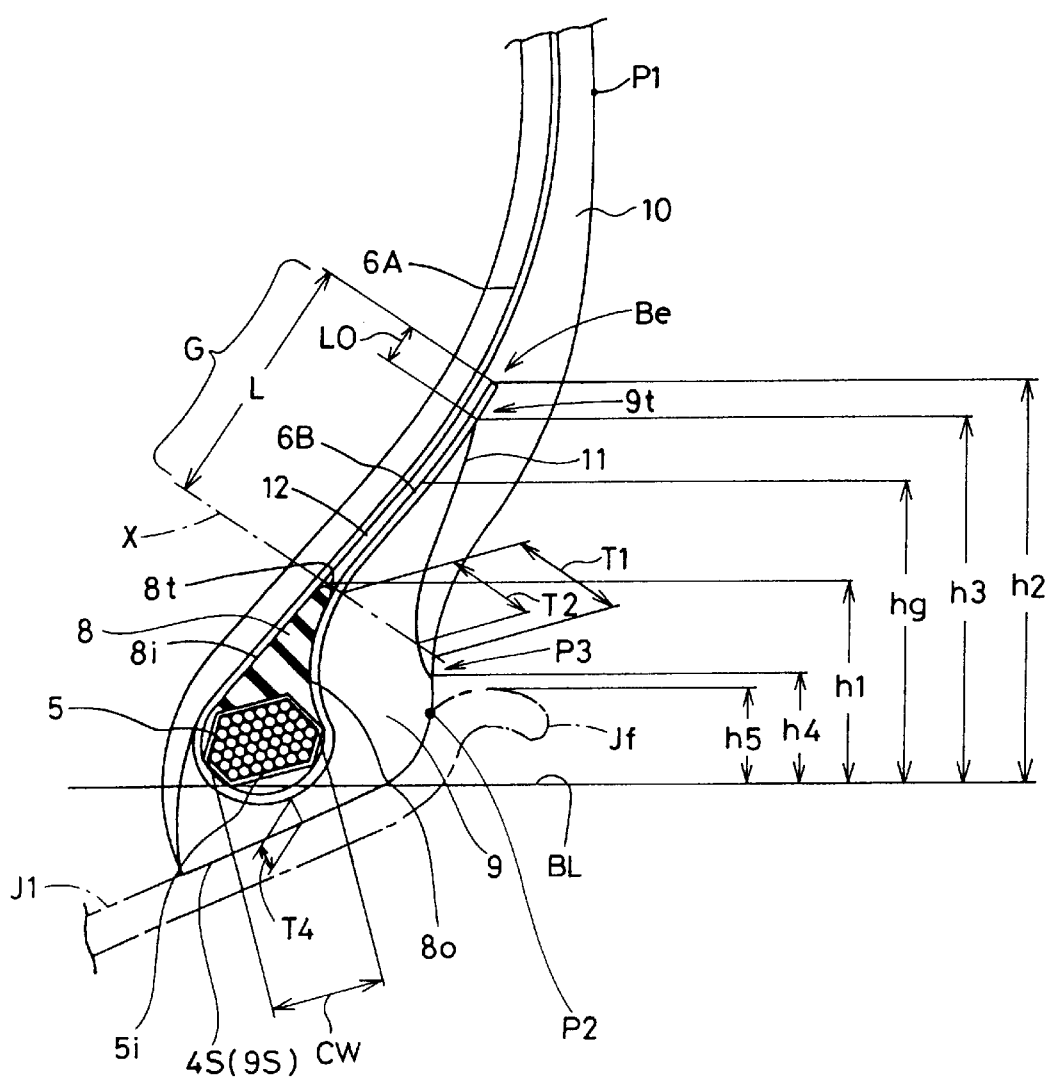
FIG. 2 is a cross sectional view showing an example if the bead portion.

The parallel part G has a length L in the range of from 0.5 to 5.0 times, preferably 1.0 to 4.0 times, more preferably 2.0 to 4.0 times the maximum-section-width CW of the bead core 5, (in this example CW is about 2.6 times). In FIG. 2, the maximum-section-width CW of the bead core 6 is measured along a direction parallel with the bead bottom line, excluding its coating rubber.

Figure 5:
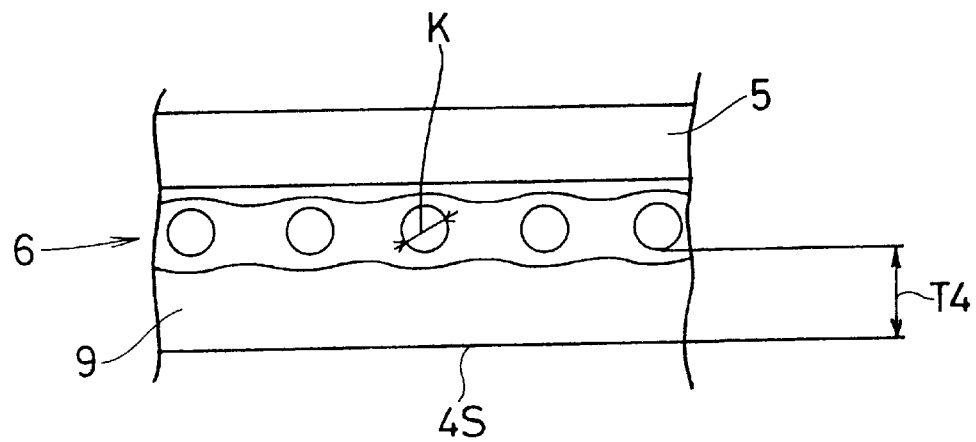
FIG. 5 is an enlarged cross sectional view for explaining the chafer rubber thickness under the bead core.

When the rubber thickness N is less than 0.15 times the maximum diameter K, the mitigation becomes insufficient, and sometimes the cords of the turnup portion 6B partially come into direct contact with those of the main portion 6A which causes a loose carcass cord, (see FIG. 4 and 5). When the thickness N is more than 4.5 times K, even if the main portion 6A and turnup portion 6B are parallel, the turnup portion 6B is liable to be broken when compressed. Further, the effect to reduce the maximum principal strain $\epsilon$ on the outer surface of a region Y has a tendency to decrease, and the heat generation is liable to increase. Here the region Y is radially inward of the maximum cross-sectional width point P1.

If the length L is less than 0.5 times the width CW, the maximum principal strain $\epsilon$ has a remarkable peak in the region Y, and cracks are liable to occur at the position of the peak at a relatively early stage. If the length L is more than 5.0 times the width CW, the outer end of the carcass turnup portion 6B is placed in a portion in which the sidewall rubber is relatively thin. Thus, the outer surface of the tire is liable to undulate, and further the rubber is liable to crack.

The FIG. 2 shows the above-mentioned chafer 9 which is disposed along the axially outer and inner and bottom surface of the bead portion 4 to be exposed at least from the bead toe to a point P3 above the bead heel, defining a surface which is in direct contact with the rim. The chafer 9 is made of a rubber having 100% modulus of from 55 to 75 kgf/sq.cm which is harder than the sidewall rubber 10 which is disposed axially outside the carcass to define the sidewall portion and has a 100% modulus of from 10 to 20 kgf/sq.cm. On the axially outside of the carcass 6 (turnup portion 6B), the chafer 9 extends radially outwardly from the underside of the bead core 5 beyond the radially outer end 8t of the bead apex 8. The radially outer end portion thereof is tapered, and the radially inner end portion of the sidewall rubber 10 is also tapered. Those tapered portions are spliced to each other.

In this spliced portion, the chafer 9 is axially inside of the sidewall rubber 10. Thus, the axially outside thereof abuts on the axially inner surface of the sidewall rubber 10, and the axially inside abuts on the axially outer surface of the carcass turnup portion 6B.

The height h4 of the above-mentioned point P3 is preferably set in the range 1.2 to 2.5 times the height h5 of the rim flange J, each measured from the bead base line BL.

The height h3 of the radially outer end 9t of the chafer is preferably more than the middle height hg of the above-mentioned parallel part G.

It is preferable that the thickness T2 of the rubber chafer 9 is 0.3 to 1.0 times, preferably 0.6 to 1.0 times the total rubber thickness T1 measured from the outer surface of the tire to the carcass 6, wherein the thickness is measured along a straight line X passing through the radially outer end 8t of the bead apex 8 at a right angle with respect to the carcass main portion 6A, as shown in FIG. 2.

If the 100% modulus of the chafer 9 is less than 55 kgf/sq.cm and/or the thickness T2 is less than 0.3 times T1, the bead rigidity becomes insufficient and the bead deformation can not be effectively controlled. If the 100% modulus of the chafer 9 is more than 75 kgf/sq.cm, heat generation increases in the bead portion 4 and the durability decreases.

If the 100% modulus of the sidewall rubber 10 is less than 10 kgf/sq.cm, it becomes difficult to protect the carcass 6 from external injuries. If the 100% modulus of the sidewall rubber 10 is more than 20 kgf/sq.cm, the rubber loses its suppleness and cracks are liable to occur on the tire outer surface.

If the height h4 of the point P3 is less than 1.2 times the rim flange height h5, the sidewall rubber 10 comes into contact with the rim flange Jf and chafes when the tire is deformed. If the height h4 is more then 2.5 times the height of h5, heat generation increases in the bead portion 4 and cracks are liable to occur in the surface of the chafer 9. Thus the durability decreases.

On the radially inside of the bead core, as shown in FIG. 5, the minimum rubber thickness T4 from the bead bottom face 4S to the carcass cords is set in the range of from 1.0 to 6.0 times the maximum diameter K of the carcass cords.

If the thickness T4 is less than 1.0 times the diameter K, the chafer rubber is liable to be broken in the bead bottom. If the thickness T4 is more than 6.0 times the diameter K, the engaging force between the tire bead and rim greatly decreases and bead durability is lost.

In FIG. 2, the height h3 of the outer end 9t of the chafer 9 is less than the turned up carcass height h2.

If the height h3 is too low, it becomes difficult to obtain a necessary bead rigidity. On the other hand, if the height h3 is too high, cracks of the chafer rubber and the loose carcass cord become liable to occur at the carcass ply turnup end Be.

Figure 3:
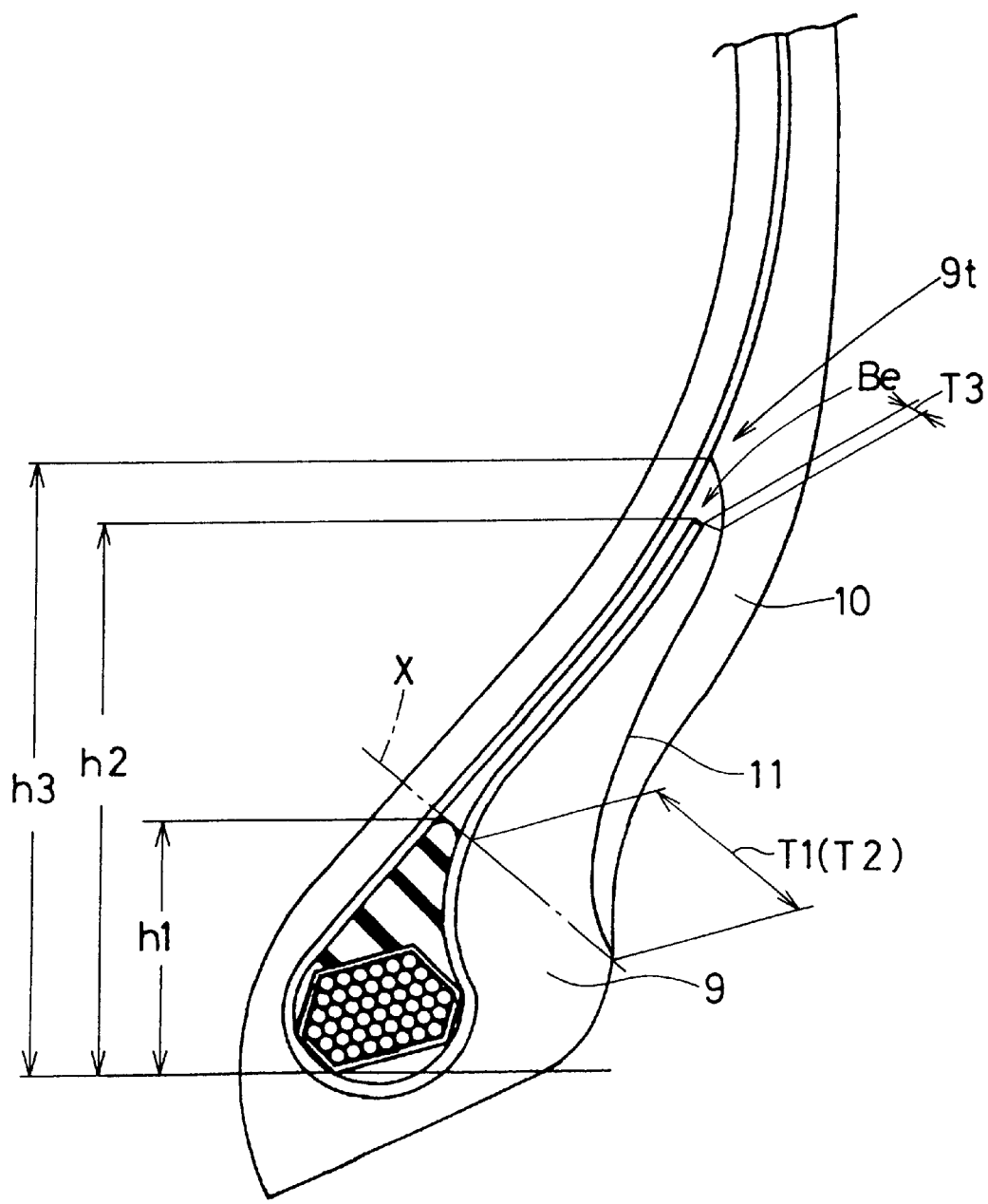
FIG. 3 is a cross sectional view showing another example of the bead portion.

However, even if h3>H2 as shown in FIG. 3, when the chafer rubber thickness T3 at the turnup end Be is set to be more than 1.7 times the maximum diameter K of the carcass cord, the cracks and loose cord can be prevented.

Further, even when h3<h2 as shown in FIG. 2, if the outer end 9t of the chafer comes near the turnup end Be, cracks and loose cord become liable to occur. Therefore, it is preferable that the outer end 9t is radially inwardly spaced apart from the turnup end Be by a certain distance L0 in the range of from 5 to 15 mm.

Figure 6:
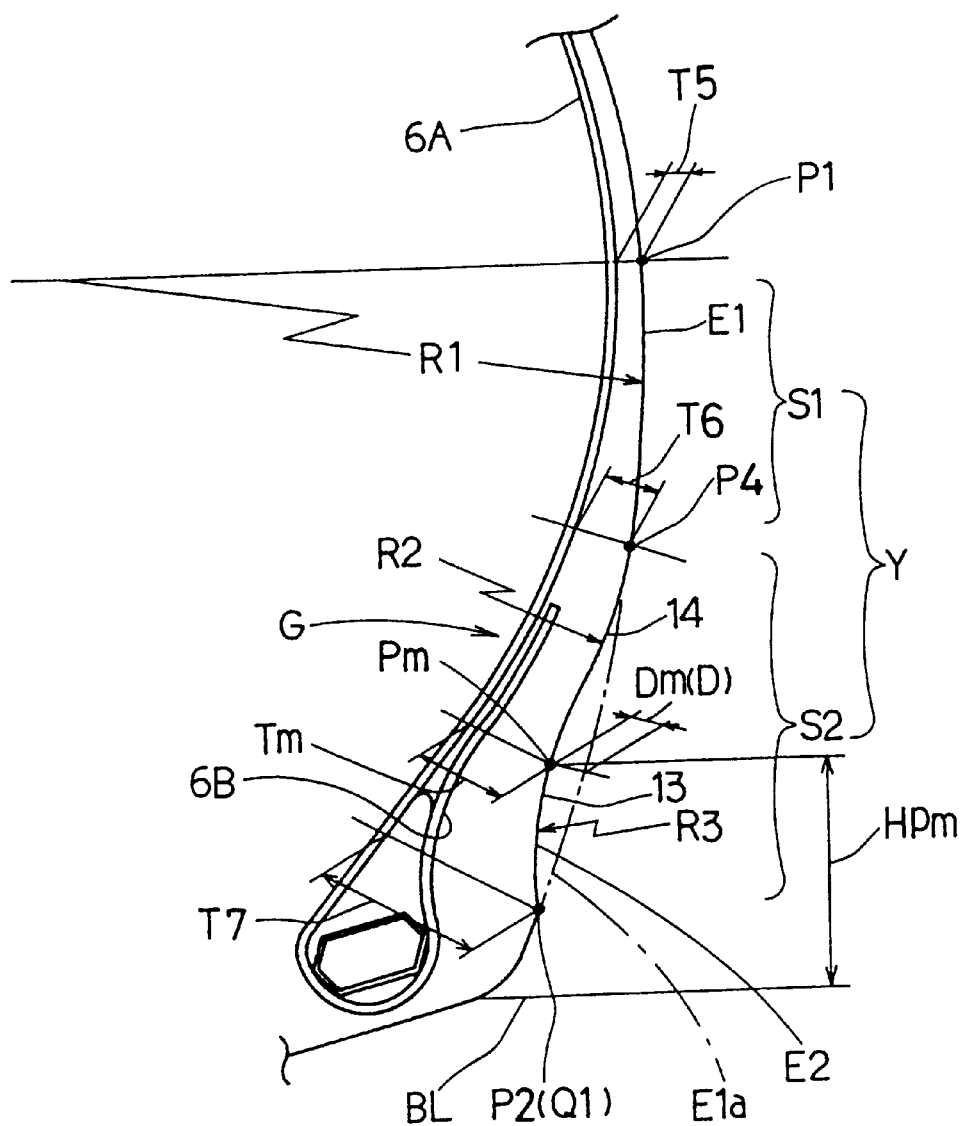
FIG. 6 is a cross sectional view for explaining the contour of the axially outer surface of the tire.

In this embodiment, in order to effectively reduce the tire weight without deteriorating the improved durability, as shown in FIG. 6, the tire is provided in the region Y with the following mid-lower sidewall contour S1 and lower sidewall contour S2 under the above-mentioned standard condition.

The mid-lower sidewall contour S1 extends from the maximum width point P1 to a radially inner point P4 along a circular arc E1 of a single radius R1 of which the center is placed on an axial line passing through the maximum width points P1. Thus the mid-lower sidewall contour S1 is convex.

The lower sidewall contour S2 is defined as extending on the axially inside of the radially inward extension E1a of the circular arc line E1. The lower sidewall contour S2 is usually composed of a transitional convex upper contour 14 and a concave lower contour 13.

The convex upper contour 14 extends a convex curved line which is preferably a circular arc having a radius R2 in the range of from 0.2 to 0.4 times the radius R1. The convex upper contour 14 is connected to the mid-lower sidewall contour S1 at a point without any inflection point.

The concave lower contour 13 extends along a concave curved line which is preferably a circular arc having a single radius R3 in the range of not more than 0.95 times the radius R2. The concave lower contour 13 is connected to the convex upper contour 14 without any inflection point. The concave lower contour 13 extends radially inwardly to a point P2 at least.

Figure 7:
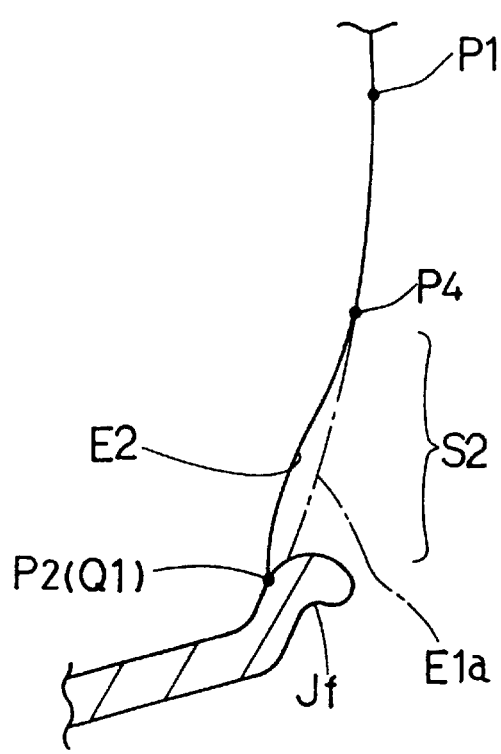
FIGS. 7 and 8 are diagrams for explaining the radially inward extent of the concave contour.
Figure 8:
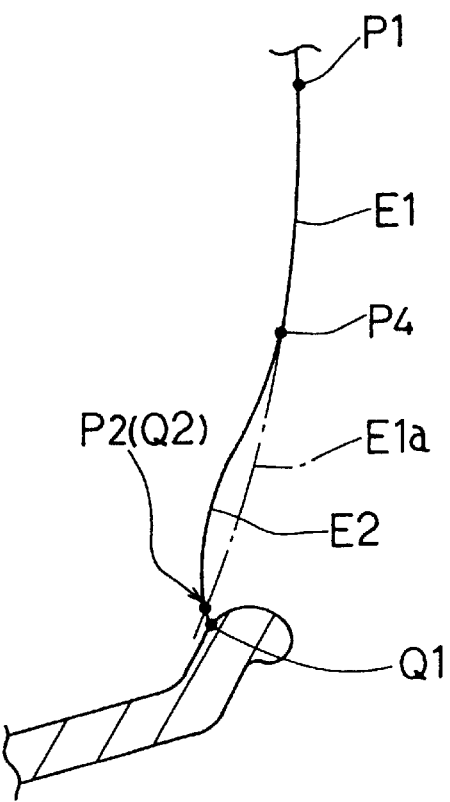

FIG. 7 and 8 show two possible cases of the position (point P2) of the radially inner end of the lower sidewall contour S2. In FIG. 7, the lower sidewall contour S2 does not intersect the circular arc line E1a, and comes in contact with the rim flange Jf at a point Q1 (hereinafter contact point Q1). In this case, the point P2 is this contact point Q1. In FIG. 8, the lower sidewall contour S2 intersects the circular arc line E1a at point Q2. In this case, the point P2 is this intersecting point Q2. In FIG. 6 in which the contour S2 intersects the line E1a at the contact point Q1, the point P2 is equal to the point Q1 and also the point Q2.

In the lower sidewall contour S2, a maximum depression Dm from the circular arc line E1a is occurred at a point Pm of which radial height Hpm is in the range of from 6 to 20%, preferably 9 to 20%, more preferably 12 to 18% of the tire section height H. The maximum depression Dm is preferably in the range of from 3 to 6 mm.

Further, the thickness from the tire outer surface to the axially outermost main portion of the carcass ply (in this example, the main portion of 6A of the carcass ply 6a) is gradually increased from the maximum width point P1 (thickness T5) to the above-mentioned point P2 (thickness T6). That is, the thickness increases from P1 (T5) to P4 (T6), and from P4 (T6) to Pm (Tm), and further from Pm (Tm) to P2 (T7). Incidentally, the above-mentioned thickness is measured from the tire outer surface to the carcass cords, excluding its topping rubber.

By providing the above explained profile in the region Y, the rubber volume is decreased, and the tire weight is reduced, and also the heat generation of the tire can be improved. Further, the distribution of the maximum principal strain can be further evened out.

Figure 9:
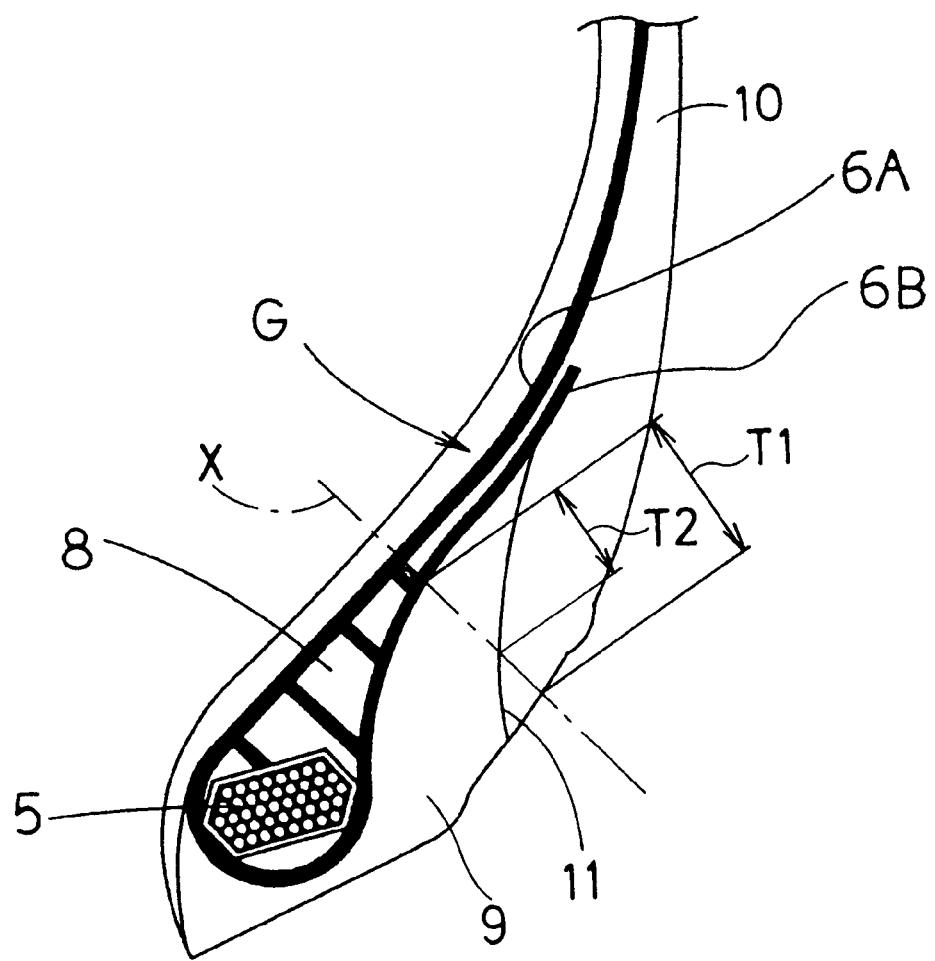
FIG. 9 is a cross sectional view showing still another example of the bead structure.

FIG. 9 shows another example in which the above-mentioned concave part 13 is not provided. In this case, it is especially preferable that the chafer thickness T2 is in the range of from 0.3 to 1.0 times the total rubber thickness T1.

Comparison Test 1

Figure 10A:
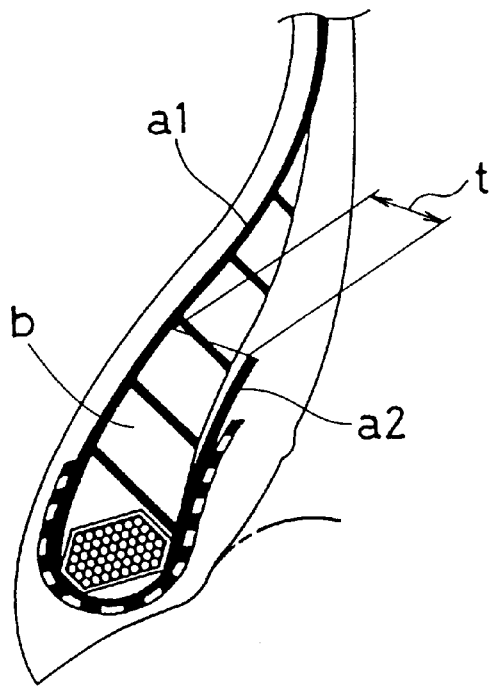
FIG. 10A is a schematic cross sectional view for explaining a conventional bead structure.
Figure 10B:
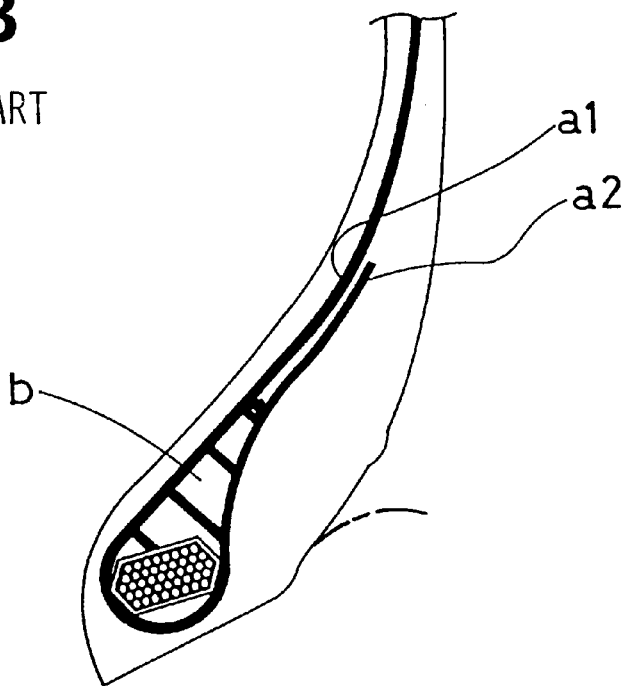
FIG. 10B is a schematic cross sectional view showing the bead structure of a reference tire used in comparison tests.

Example tire A (FIG. 9) having the parallel part G but not the concave part 13, Example tire B (FIG. 1) having both the parallel part G and concave part 13, and a conventional tire (FIG. 10A) were measured for the maximum principal strain $\epsilon$. The results are shown in FIG. 11.

Figure 11:
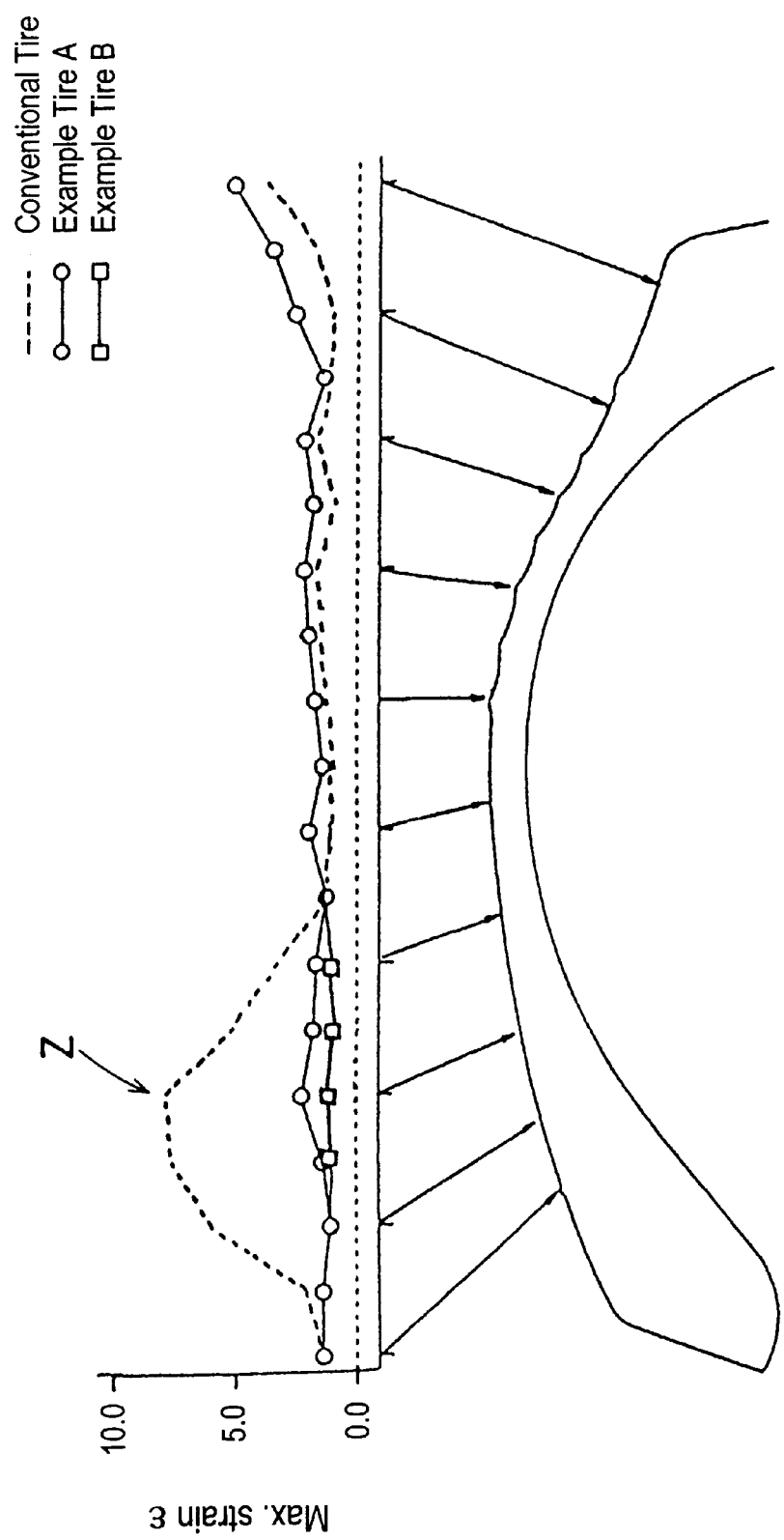
FIG. 11 is a graph showing distributions of maximum principal strain.

In the conventional tire, as shown in FIG. 11, a peak Z of about 7 or 8% occurred in the region Y. However, in the example tires A and B, a remarkable peak was not observed, and the maximum principal strain was decreased to substantially even value of under 4.0%.

Figure 12:
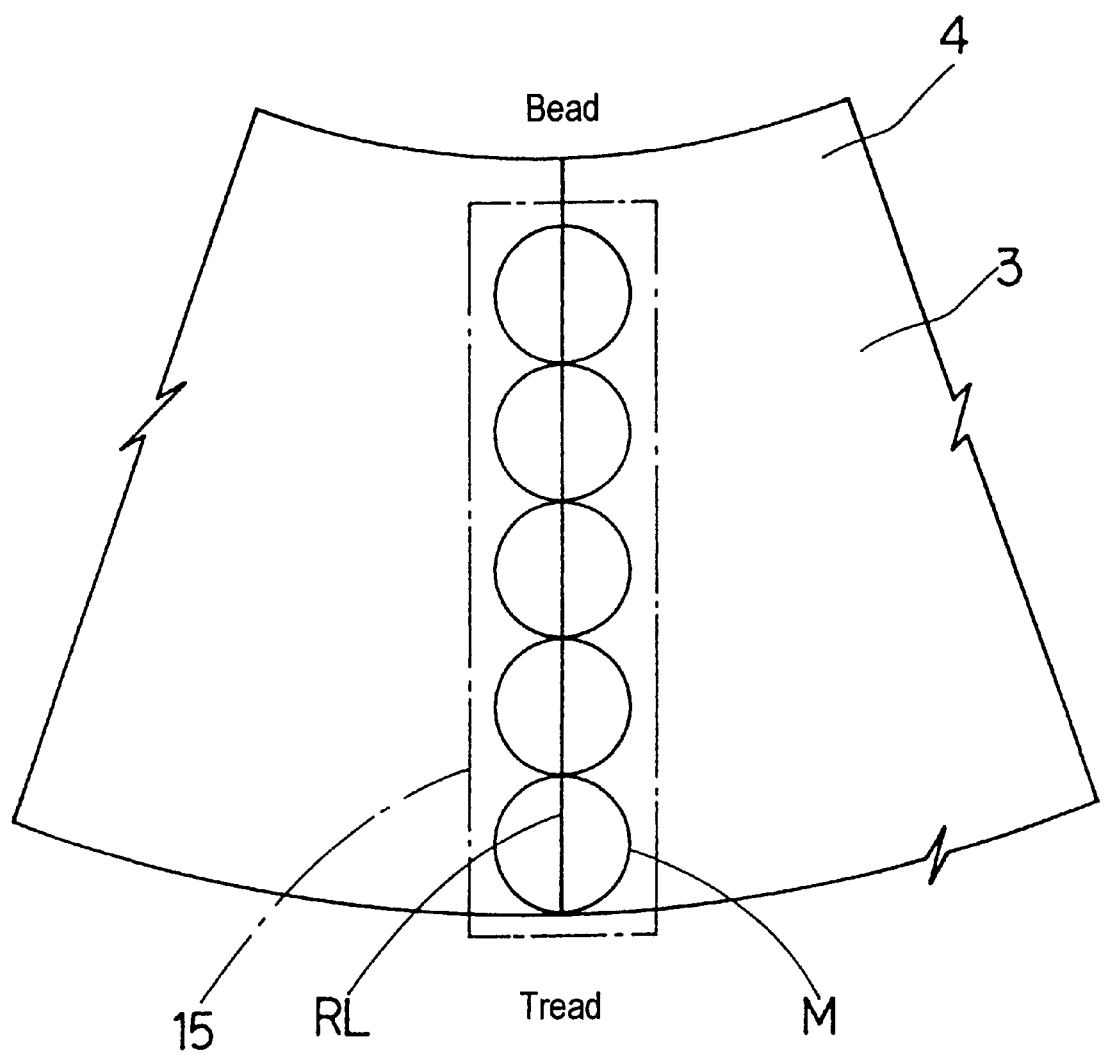
FIGS. 12 and 13 are diagrams for explaining a method of measuring the maximum principal strain.
Figure 13:
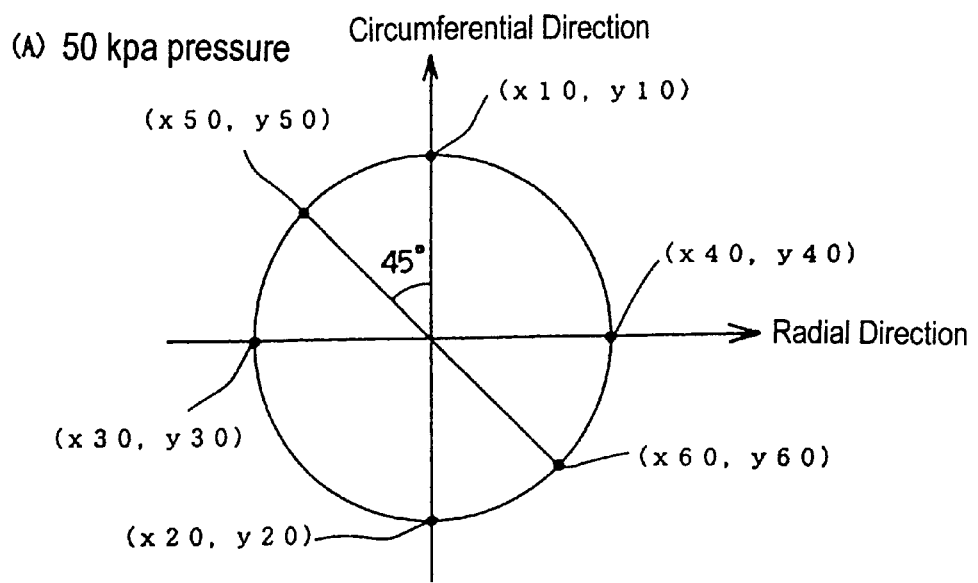
Figure 13:
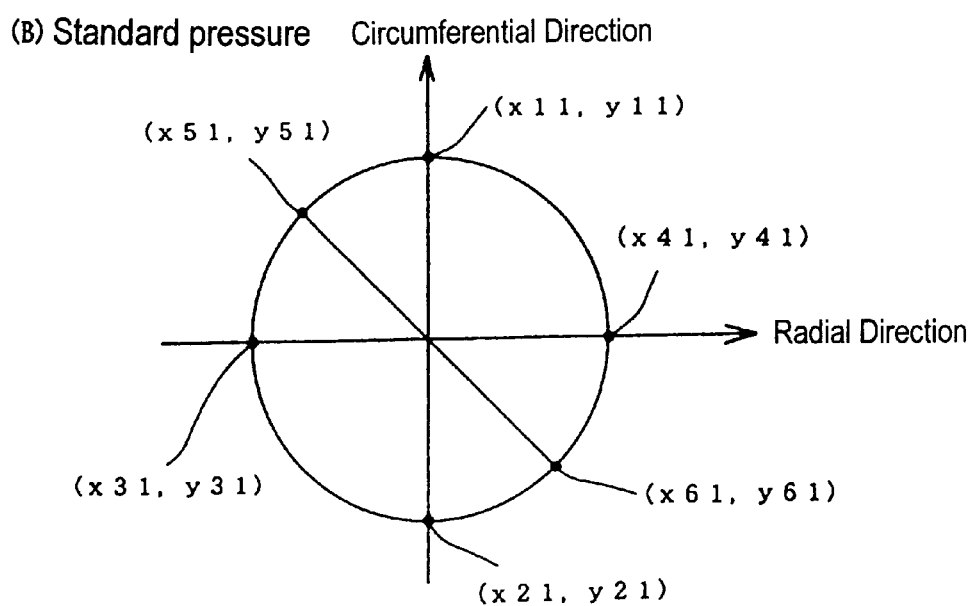

The principal strain $\epsilon$ was obtained as follows: (1) buff the surface of the sidewall portion 3 and bead portion 4; (2) wash the surface of the sidewall with naphtha; (3) apply adhesive agent to the surface; (4) inflate the tire to a pressure of 50 kpa; (5) draw a radially extending strait line RL and copy a series of circles M from a vinyl tape 15 to the surface along the line RL as shown in FIG. 12 wherein the FIG. 12 where the circles are printed in white ink (titanium oxide+ DOP+castor oil) using a printing screen; (6) inflate the tire to the standard pressure; (7) copy the circles from the tire surface to a new blank tape; (8) measure the circles on the tapes (under the standard pressure and 50 kpa) for the abscissa values and ordinate values shown in FIG. 13; and (9) compute the principal strain $\epsilon$ using the following equations.

Principal Strain
$$\varepsilon = \frac{\varepsilon_c + \varepsilon_r}{2} + \frac{\sqrt{(\varepsilon_c - \varepsilon_r)^2 + \gamma^2}}{2}$$

Circumferential Strain
$$\varepsilon_c = \frac{L1_c - L0_c}{L0_c}$$

Radial Strain
$$\varepsilon_r = \frac{L1_r - L0_r}{L0_r}$$

Sharing Strain
$$\gamma = \varepsilon_c + \varepsilon_r - 2 \times \varepsilon_{135}$$

135 degree direction strain
$$\varepsilon_{135} = \frac{L1_{135} - L0_{135}}{L0_{135}}$$

Under 50 kpa pressure

Circumferential length
$$L0_c = \sqrt{(X10 - X20)^2 + (Y10 - Y20)^2}$$

Radial Length
$$L0_r = \sqrt{(X30 - X40)^2 + (Y30 - Y40)^2}$$

135 degree direction length
$$L0_{135} = \sqrt{(X50 - X60)^2 + (Y50 - Y60)^2}$$

Under the standard pressure

Circumferential length
$$L1_c = \sqrt{(X11 - X21)^2 + (Y11 - Y21)^2}$$

Radial length
$$L1_r = \sqrt{(X31 - X41)^2 + (Y31 - Y41)^2}$$

135 degree direction length
$$L1_{135} = \sqrt{(X51 - X61)^2 + (Y51 - Y61)^2}$$

Comparison Test 2

Heavy duty radial tire (Example tires 1 to 17, Reference tire 1, Conventional tire 1) were made and tested for bead durability, chafer's cracks and tire weight. The specifications of the test tires are shown in Table 1 and below.

Carcass: number of ply: 1
 cord: steel cord (3×0.20+7×0.23)
 cord angle: 90 degrees with respect to the tire equator
 cord count: 38/5 cm Belt: number of ply: 4
 cord: steel cord (3×0.20+6×0.35)
 cord angle: +67/+18/−18/−18 degrees with respect to the tire equator (from inner ply to outer ply)
 cord count: 26/5 cm Tire size: 11R22.5

Rim size: 8.25×22.5 (standard rim)

Bead Durability Test

Using a tire test drum, test tires were run for 10,000 km under the following extraordinary conditions, and the running distance L1 until any visible damage which appears was measured.

Tire/load: 9000 kg

Speed: 20 km/h

Inner pressure: 1000 kPa

In the table, the ratio of the running distance L1 to 10,000 km is shown as the durability, using an index based on the conventional tire being 100. The larger the index, the better the durability.

Crack Resistance Test

After the Bead Durability Test, the bead bottom face was visually inspected for cracks.

Tire Weight Test

The tire weight is indicated by an index based on the conventional tire being 100.

As described above, in the pneumatic tires according to the present invention, the bead apex height is decreased, and the parallel part is formed and the rubber chafer height is increased. As a result, the bead durability can be effectively improved.

TABLE 1

| Tire | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| Structure (FIG.) | 1 | 1 | 1 | 1 | 1 | 1 | 1 | 1 | 1 | 1 |
| h1 (mm) | 30 | 30 | 30 | 30 | 30 | 30 | 30 | 30 | 30 | 30 |
| h3 (mm) | 67 | 67 | 67 | 67 | 67 | 67 | 67 | 67 | 67 | 67 |
| h1/h3 | 0.45 | 0.45 | 0.45 | 0.45 | 0.45 | 0.45 | 0.45 | 0.45 | 0.45 | 0.45 |
| T2 (mm) | 3 | 4.5 | 12 | 15 | 12 | 12 | 12 | 12 | 12 | 12 |
| T2/T1 | 0.2 | 0.3 | 0.8 | 1 | 0.8 | 0.8 | 0.8 | 0.8 | 0.8 | 0.8 |

TABLE 1-continued

|  |  |  |  |  |  |  |  |  |  |  |
|---|---|---|---|---|---|---|---|---|---|---|
| L (mm) | 48 | 48 | 48 | 48 | 8 | 16 | 64 | 80 | 48 | 48 |
| L/CW | 3 | 3 | 3 | 3 | 0.5 | 1 | 4 | 5 | 3 | 3 |
| Cord spacing N (mm) | 1.9 | 1.9 | 1.9 | 1.9 | 1.9 | 1.9 | 1.9 | 1.9 | 0 | 0.11 |
| N/K | 2.5 | 2.5 | 2.5 | 2.5 | 2.5 | 2.5 | 2.5 | 2.5 | 0 | 0.15 |
| T4 (mm) | 3.1 | 3.1 | 3.1 | 3.1 | 3.1 | 3.1 | 3.1 | 3.1 | 3.1 | 3.1 |
| T4/K | 4 | 4 | 4 | 4 | 4 | 4 | 4 | 4 | 4 | 4 |
| Bead durability | 120 | 180 | 200 | 200 | 150 | 170 | 200 | 200 | 110 | 180 |
| Bead bottom crack | non | non | non | non | non | non | non | non | non | non |
| Tire weight | 88 | 88 | 88 | 88 | 85 | 86 | 89 | 90 | 87 | 87 |

| Tire | Ex 11 | Ex 12 | Ex 13 | Ex 14 | Ex 15 | Ex 16 | Ex 17 | Ref. 1 | Conv |
|---|---|---|---|---|---|---|---|---|---|
| Structure (FIG.) | 1 | 1 | 1 | 1 | 1 | 1 | 1 | 10B | 10A |
| h1 (mm) | 30 | 30 | 30 | 30 | 30 | 30 | 30 | 90 | 90 |
| h3 (mm) | 67 | 67 | 67 | 67 | 67 | 67 | 67 | 25 | 53 |
| h1/h3 | 0.45 | 0.45 | 0.45 | 0.45 | 0.45 | 0.45 | 0.45 | 1.2 | 1.7 |
| T2 (mm) | 12 | 12 | 12 | 12 | 12 | 12 | 12 | 12 | 0 |
| T2/T1 | 0.8 | 0.8 | 0.8 | 0.8 | 0.8 | 0.8 | 0.8 | 0.8 | 0 |
| L (mm) | 48 | 48 | 48 | 48 | 48 | 48 | 48 | 48 | 0 |
| L/CW | 3 | 3 | 3 | 3 | 3 | 3 | 3 | 3 | 0 |
| Cord spacing N (mm) | 1.9 | 3.9 | 4.6 | 1.9 | 1.9 | 1.9 | 1.9 | 1.9 | 11 |
| N/K | 2.5 | 5 | 6 | 2.5 | 2.5 | 2.5 | 2.5 | 2.5 | 14.5 |
| T4 (mm) | 3.1 | 3.1 | 3.1 | 0.8 | 1.5 | 3.9 | 4.6 | 4.6 | 1.9 |
| T4/K | 4 | 4 | 4 | 1 | 2 | 5 | 6 | 6 | 2.5 |
| Bead durability | 200 | 200 | 200 | 200 | 200 | 180 | 150 | 90 | 100 |
| Bead bottom crack | non | non | non | occurred | non | non | non | non | non |
| Tire weight | 88 | 89 | 90 | 85 | 87 | 88 | 89 | 83 | 100 |

What is claimed is:

1. A heavy duty radial tire comprising a tread portion, a pair of sidewall portions, a pair of bead portions with a bead core therein, a carcass comprising a ply of cords arranged radially at an angle of from 70 to 90 degrees with respect to the tire equator extending between the bead portions through the tread portion and sidewall portions and turned up around the bead cores from the axially inside to the outside of the tire to form a pair of turnup portions and a main portion therebetween, a bead apex disposed between the main portion and each turnup portion of the carcass ply and extending radially outwardly from the bead core, and a chafer having a radially outer end and disposed in each bead portion to define a rim contacting surface, each said turnup portion extending radially outwardly beyond the radially outer end of the bead apex so that the turnup portion has a parallel part which is placed adjacent to and substantially in parallel with the main portion, said chafer extending radially outwardly along the axially outside of the turnup portion beyond the radially outer end of the bead apex and the radially outer end of said chafer is radially inwardly spaced apart from the radially outer end of the turnup portion by a distance of 5 mm to 15 mm under a normally inflated unloaded condition.

2. The heavy duty radial tire according to claim 1, wherein, in the parallel part, the rubber thickness N between the carcass cords of the turnup portion and those of the main portion is 0.15 to 4.5 times the maximum diameter K of the carcass cords.

3. The heavy duty radial tire according to claim 1, wherein the thickness T2 of the chafer is 0.3 to 1.0 times the total rubber thickness T1 from the outer surface of the tire to the carcass when measured along a straight line drawn at a right angle to the main portion through the radially outer end of the bead apex under a normally inflated unloaded condition.

4. The heavy duty radial tire according to claim 3, wherein the length L of the parallel part is 0.5 to 5.0 times a section width CW of the bead core.

5. The heavy duty radial tire according to claim 3, wherein, in the parallel part, the rubber thickness N between the carcass cords of the turnup portion and those of the main portion is 0.15 to 4.5 times the maximum diameter K of the carcass cords.

6. The heavy duty radial tire according to claim 1, wherein the length L of the parallel part is 0.5 to 5.0 times a section width CW of the bead core.

7. The heavy duty radial tire according to claim 6, wherein, in the parallel part, the rubber thickness N between the carcass cords of the turnup portion and those of the main portion is 0.15 to 4.5 times the maximum diameter K of the carcass cords.

* * * * *